United States Patent
Boss et al.

(10) Patent No.: US 7,836,432 B2
(45) Date of Patent: Nov. 16, 2010

(54) SYSTEMS AND METHODS FOR EMBEDDED APPLICATION TEST SUITES

(75) Inventors: Gregory Jensen Boss, American Fork, UT (US); Jonathan Thomas Harding, Charlotte, NC (US); Rick Allen Hamilton, II, Charlottesville, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 12/053,462

(22) Filed: Mar. 21, 2008

(65) Prior Publication Data

US 2008/0215931 A1  Sep. 4, 2008

Related U.S. Application Data

(63) Continuation of application No. 11/191,620, filed on Jul. 28, 2005, now abandoned.

(51) Int. Cl.
    G06F 9/44 (2006.01)
(52) U.S. Cl. .................................................. 717/124
(58) Field of Classification Search .................. 717/124
    See application file for complete search history.

(56) References Cited

U.S. PATENT DOCUMENTS

| | | | |
|---|---|---|---|
| 5,119,377 A | 6/1992 | Cobb et al. | |
| 5,513,316 A | 4/1996 | Rodrigues et al. | |
| 5,835,735 A | 11/1998 | Mason et al. | |
| 5,838,948 A | 11/1998 | Bunza | |
| 6,128,618 A | 10/2000 | Eliovson | |
| 6,311,149 B1 | 10/2001 | Ryan et al. | |
| 6,427,224 B1 | 7/2002 | Devins et al. | |
| 6,615,376 B1 | 9/2003 | Olin et al. | |
| 6,618,823 B1 | 9/2003 | West | |
| 6,708,333 B1 | 3/2004 | Glerum et al. | |
| 6,928,579 B2 | 8/2005 | Aija et al. | |
| 2002/0055834 A1 | 5/2002 | Andrade et al. | |
| 2002/0112145 A1 | 8/2002 | Bigbee et al. | |
| 2002/0133581 A1 | 9/2002 | Schwartz et al. | |
| 2003/0046681 A1 | 3/2003 | Barturen et al. | |
| 2004/0015747 A1 | 1/2004 | Dwyer | |
| 2004/0103412 A1 | 5/2004 | Rao et al. | |
| 2005/0022176 A1 | 1/2005 | Ramachandran et al. | |

OTHER PUBLICATIONS

Dillon, Andrew, Notice of Allowance; mail date Oct. 28, 2008; published by the Dillon & Yudell in utility U.S. Appl. No. 11/041,712, pp. -3.

(Continued)

*Primary Examiner*—Philip Wang
(74) *Attorney, Agent, or Firm*—William H. Steinberg; Schubert Law Group PLLC (57) ABSTRACT

Systems, methods and media for testing computer programs in response to a program upgrade or installation are disclosed. In one embodiment, a computer executes software to detect when an upgrade or an installation occurs. When an upgrade or installation occurs the computer initiates a test of one or more applications and/or operating systems. The results of these tests are logged in one or more error logs that can be displayed to a program developer or operating system administrator for diagnosis.

20 Claims, 4 Drawing Sheets

OTHER PUBLICATIONS

Ehne, Charles, Notice of Allowance; mail date Sep. 9, 2008; published by the USPTO in utility U.S. Appl. No. 11/041,712, pp. -7.

Boice, James E., Preliminary Amendment; mail date Mar. 28, 2008; published by the Dillon & Yudell in utility U.S. Appl. No. 11/041,712, pp. -5.

SYSTEMS AND METHODS FOR EMBEDDED APPLICATION TEST SUITES

This application is a continuation of U.S. application Ser. No. 11/191,620, filed Jul. 28, 2005, now abandoned.

FIELD

The present invention is in the field of computer program testing. More particularly, the invention relates to automated testing of application programs and operating system programs when a program installation or upgrade occurs.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, and facsimile.

Users of digital processors such as computers continue to demand greater and greater performance from such systems for handling increasingly complex and difficult tasks. In addition, processing speed has increased much more quickly than that of main memory accesses. As a result, cache memories, or caches, are often used in many such systems to increase performance in a relatively cost-effective manner. Many modern computers also support "multi-tasking" or "multi-threading" in which two or more programs, or threads of programs, are run in alternation in the execution pipeline of the digital processor.

A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

System and application program reliability is an important concern, not only for users of computers, but for program developers as well. When an operating system is upgraded, one or more applications programs residing in the computer may lose functionality. This could occur because the upgraded operating system no longer supports certain functionality of older software. As another example, when an application program is upgraded, a different application that interacts with the upgraded application program may lose interactive functionality because the upgraded application no longer supports certain interactive functionality of the other program.

With server consolidation efforts and function-rich applications becoming more prevalent in the IT world, the need for embedded application test methods which provide for meaningful interfaces with operating systems exists. Systems now may contain hundreds of disparate applications, where increasingly, modifications to a single application could disrupt other applications or, even worse, the entire system. Additionally, the requirement for application testing prior to and after an application or OS upgrade exists. Upon application upgrade or initial installation, some functions might not work correctly. Some of these functions might be critical to the application and affect those end users only; however, some of these functions might affect the entire system and cause critical system failures or corruption. Finally, application developers often do not have the resources of private IT companies, with regard to homogeneous systems running a myriad of software at the same time. In these cases, customers have to discover errors in the applications and provide feedback to the application developers, so fixes can be generated.

Functional testing software exists to test software functionality. However, applications are generally not tested after initial development or initial installation. Typically, the functional testing software is not shipped with the software it tests. There is a need for embedded software to perform tests of application programs and operating system programs when a program upgrade or installation occurs.

SUMMARY

The problems identified above are in large part addressed by systems, methods and media for testing application programs and operating system programs. One embodiment is a system for testing application programs, comprising a detection mechanism to detect an installation event comprising installation or upgrade of an application program on a computer system. The system also comprises a test initiator to initiate a test sequence of at least one of the application programs if a new installation or upgrade is detected by the detection mechanism. Further, the system comprises an error detection component to detect if an error occurs during execution of an initiated test sequence.

Embodiments include a computer with self-testing functionality; comprising a test control component to detect an installation event comprising an upgrade of an application program. The computer also comprises a test initiation component responsive to detection of an installation event to initiate a test sequence to test an application program for which an installation event has occurred. The computer also comprises an error detection component to detect if an error occurs during execution of an initiated test sequence.

Another embodiment of the invention provides a machine-accessible medium containing instructions effective, when executing in a data processing system, to cause the system to perform a series of operations for testing one or more programs upon the occurrence of an installation event. The series of operations generally include detecting an installation event comprising an upgrade of an application program, initiating a test sequence in response to detection of an installation event to test one or more applications, and detecting if an error occurs during execution of an initiated test sequence.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods and media for testing computer programs in response to a program upgrade or installation are disclosed. In one embodiment, a computer executes software to detect when an upgrade or an installation occurs. When an upgrade or installation occurs the computer initiates a test of one or more applications and/or operating systems. The results of these tests are logged in one or more error logs that can be displayed to a program developer or operating system administrator for diagnosis.

Figure 1:
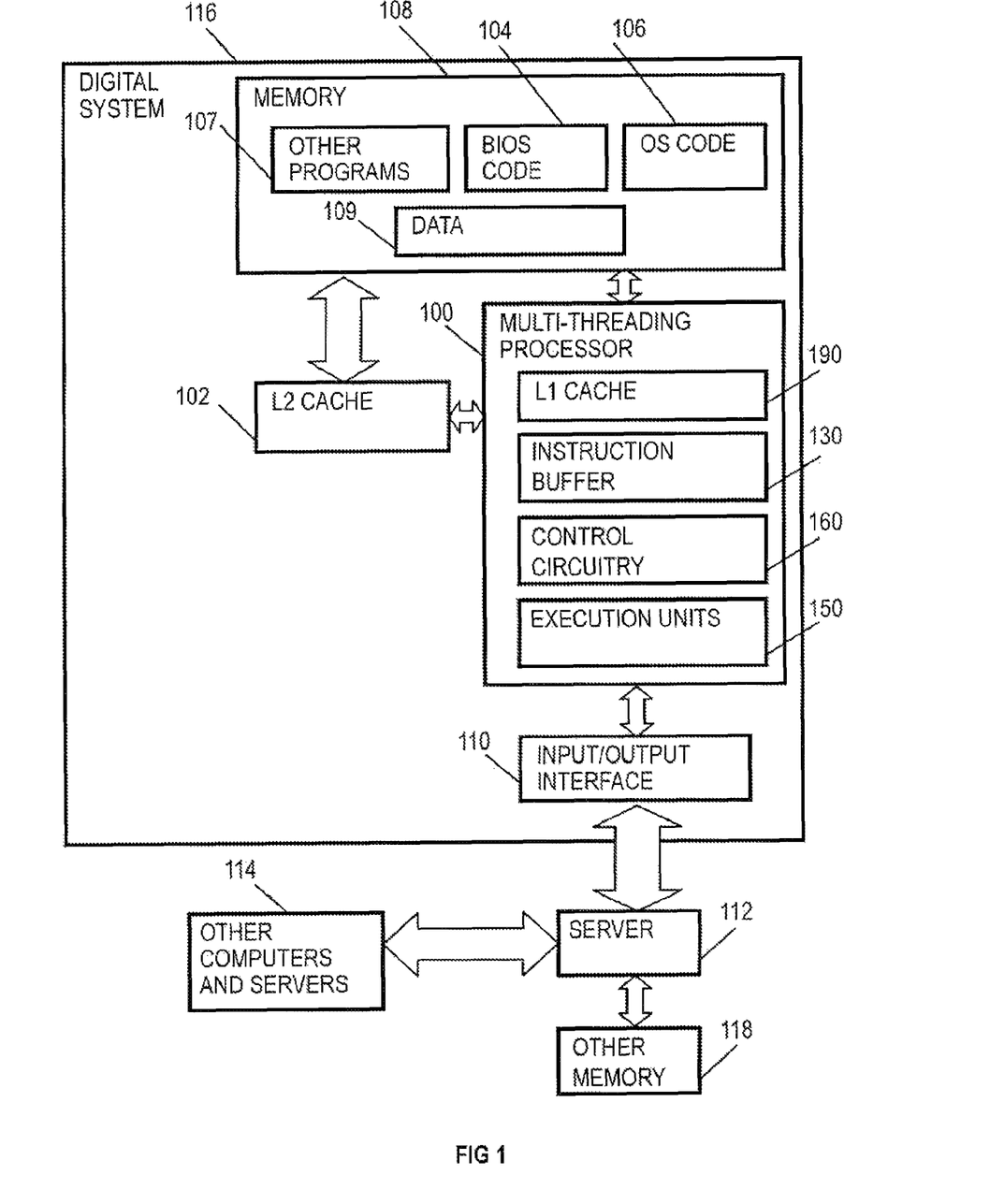
FIG. 1 depicts an embodiment of a digital system within a network; within the digital system is a processor.

FIG. 1 shows a digital system 116 such as a computer or server implemented according to one embodiment of the present invention. Digital system 116 comprises a processor 100 that can operate according to BIOS (Basis Input/Output System) Code 104 and Operating System (OS) Code 106. The BIOS and OS code is stored in memory 108. The BIOS code is typically stored on Read-Only Memory (ROM) and the OS code is typically stored on the hard drive of computer system 116. Memory 108 also stores other programs for execution by processor 100 and stores data 109 Digital system 116 comprises a level 2 (L2) cache 102 located physically close to multi-threading processor 100.

Processor 100 comprises an on-chip level one (L1) cache 190, an instruction buffer 130, control circuitry 160, and execution units 150. Level 1 cache 190 receives and stores instructions that are near to time of execution. Instruction buffer 130 forms an instruction queue and enables control over the order of instructions issued to the execution units. Execution units 150 perform the operations called for by the instructions. Execution units 150 may comprise load/store units, integer Arithmetic/Logic Units, floating point Arithmetic/Logic Units, and Graphical Logic Units. Each execution unit comprises stages to perform steps in the execution of the instructions received from instruction buffer 130. Control circuitry 160 controls instruction buffer 130 and execution units 150. Control circuitry 160 also receives information relevant to control decisions from execution units 150. For example, control circuitry 160 is notified in the event of a data cache miss in the execution pipeline.

Digital system 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Digital systems 116 may include personal computers, workstations, servers, mainframe computers, notebook or laptop computers, desktop computers, or the like. Processor 100 may also communicate with a server 112 by way of Input/Output Device 110. Server 112 connects system 116 with other computers and servers 114. Thus, digital system 116 may be in a network of computers such as the Internet and/or a local intranet. Further, server 112 may control access to another memory 118 comprising tape drive storage, hard disk arrays, RAM, ROM, etc.

In one mode of operation of digital system 116, the L2 cache receives from memory 108 data and instructions expected to be processed in the processor pipeline of processor 100. L2 cache 102 is fast memory located physically close to processor 100 to achieve greater speed. The L2 cache receives from memory 108 the instructions for a plurality of instruction threads. Such instructions may include branch instructions. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Execution units 150 may comprise load/store units, integer Arithmetic/Logic Units, floating point Arithmetic/Logic Units, and Graphical Logic Units. Each of the units may be adapted to execute a specific set of instructions. Instructions can be submitted to different execution units for execution in parallel. In one embodiment, two execution units are employed simultaneously to execute certain instructions. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

Thus, the system of FIG. 1 may include a plurality of computers with processors and memory as just described, connected in a network served by a server. The server facilitates and coordinates communications between the computers in the network. Each computer has its own memory for storing its operating system, BIOS, and the code for executing application programs, as well as files and data. The memory of a computer comprises Read-Only-Memory (ROM), cache memory implemented in DRAM and SRAM, a hard disk drive, CD drives and DVD drives. The server also has its own memory and may control access to other memory such as tape drives and hard disk arrays. Each computer may store its own application programs. Some application programs, such as databases, may reside in the server. Thus, each computer may access the same database stored in the server. In addition, each computer may access other memory by way of the server. A memory gradation therefore exists, with faster and more costly memory close to the processors of the computers and server, and slower, cheaper memory further away from the processors.

In the course of operation of the system of FIG. 1, application programs and operating systems may need from time to time to be upgraded. Sometimes, after an upgrade, a formerly working program no longer fully works, having lost some of its functionality due to the upgrade. For example, one may upgrade the operating system and then discover that an application program has lost functionality because the new operating system no longer supports certain functions of the application. Also, one may upgrade an application program and then discover that it lacks certain functionality because new functions are not supported by the operating system or by other application programs. Other problems arising from the interaction of operating systems and application programs, and the interaction of application programs with other application programs, can and do occur.

Accordingly, embodiments provide a method for automated and manual testing of application programs and operating systems, either initially, when a program is installed, or when a program is upgraded, or at a time of a system manager's choosing. The program for initiating and controlling the test may reside in the same memory as the operating system and application programs. When a program installation, reinstallation, or upgrade occurs (herein referred to as an installation event), the test controller will access an Application Program Interface (API) of an application program to be tested. Through the API, the test controller will cause the application program to perform a series of functional tests. These functional test results indicate the level of functionality of the program.

If during execution of the sequence of instructions a failure occurs, the instruction which gives rise to the error will send a return code to the operating system. The test controller will log the error into an error log, which is a file containing a description of each logged error. This file may comprise a file allocation table comprising information about the error. The file also may comprise the return code of each failed instruction. The file may also comprise a written description of an error in human language. The application program developer may use this log to debug the application program software. Also, the log informs the user there is a problem with the program which may affect results. Normally, a log file will contain a log of errors in the order they are discovered by the operating system or the test controller.

In one embodiment, a single instruction from the test controller to the API will cause the receiving API to execute a sequence of test instructions that are part of the API. Execution of the sequence will test a plurality of functions of the application program. In another embodiment, the test controller supplies a sequence of test instructions to the API to exercise the functionality of the application program. In another embodiment, the test controller itself is embedded in the operating system.

Figure 2:
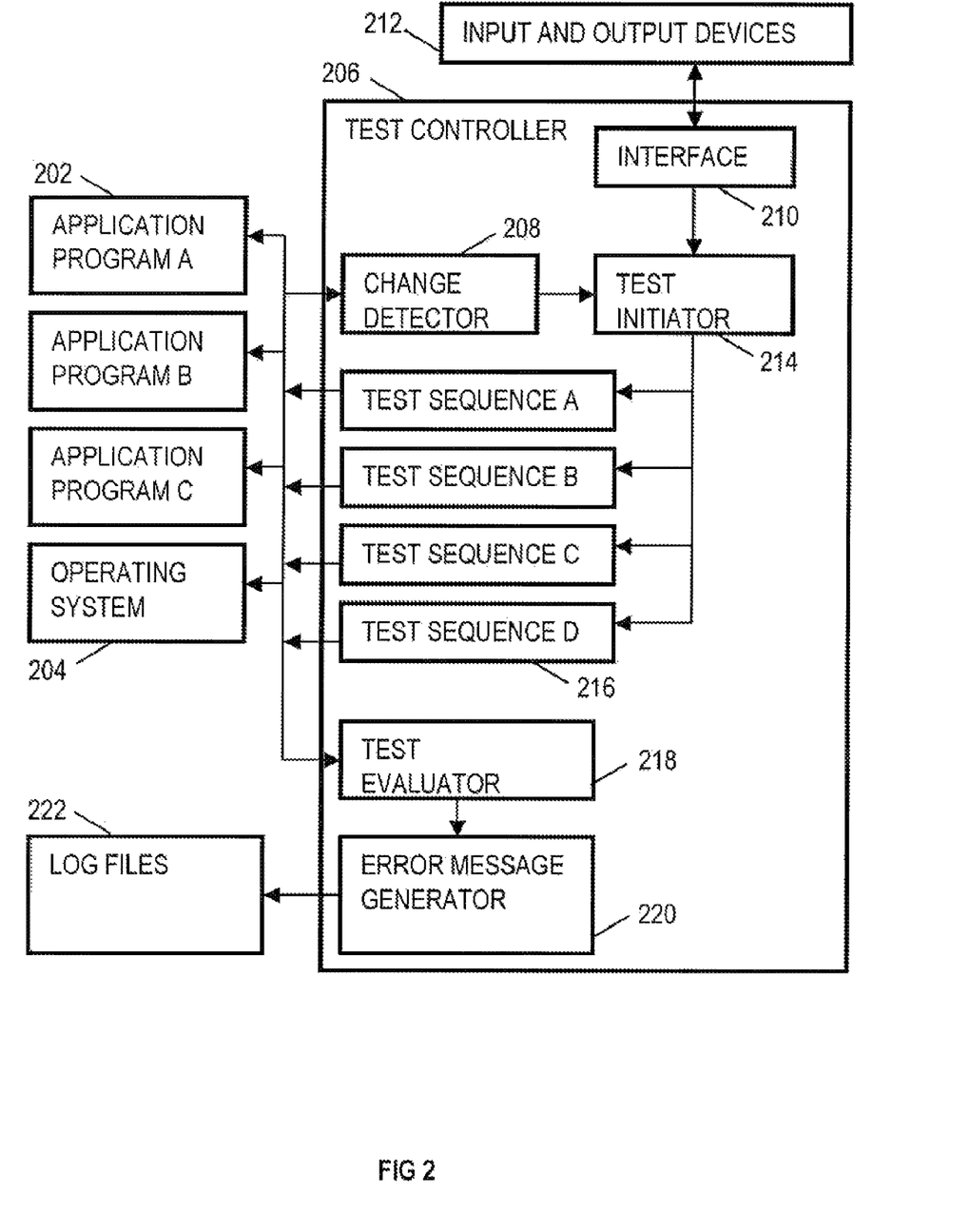
FIG. 2 depicts an embodiment of an embedded test suite for testing application programs and operating systems.

FIG. 2 shows an embodiment for automated testing of a suite of application programs 202 and an operating system 204. Each application program 202, labeled A, B and C, has its own functionality. Some application programs interact with other application programs. For example, a computer system may comprise application programs that include a word processing program and an e-mail program. Familiar examples of such programs are Microsoft Word and Microsoft Outlook, respectively. Each program has functionality not found in the other. Further, each program is adapted to interact with the other. For example, when a user initiates a new email message, Outlook may open a window that enables drafting of the email message using word editing features of Word. The operating system also has functionality of its own. For example, the operating system handles the movement of data and instructions between a hard drive and a cache of the computer. Further, the operating system controls the execution of functions of different applications that may be running at the same time. The operating system therefore inherently interacts with applications that run on the processor that is controlled by the operating system.

An embodiment comprises a test controller 206. Test controller 206 may be implemented as software that can be stored on a computer's hard drive and executed by the computer's processor. Alternatively, test controller 206 may be installed on a server that can communicate with computers in a network. Thus, in a network environment with the test controller installed on a server, the server will detect an operating system upgrade or an application program installation or upgrade, and run a suite of tests on the programs of the subject computer. Test controller 206 therefore comprises a change detector 208 to receive an indication from one or more operating systems that an upgrade has occurred. Change detector 208 may also receive an indication from an application program that an installation or upgrade has occurred. When an upgrade occurs the processor updates an entry in the registry to indicate that a newer version of a program has been installed.

When change detector 208 detects that a change has occurred, such as a new installation or upgrade, it communicates the indication to a test initiator 214, along with a code to indicate which program or operating system has changed. In addition, test initiator 214 may receive a signal from an interface 210. Interface 210 may be software that enables communication between test initiator 214 and user-controllable input and output devices 212. Input and output devices 212 may comprise a keyboard, a mouse, a color video monitor and a printer. In an embodiment, interface 210 may cause a window to be displayed on a computer's or server's video monitor, allowing selection of various test options. For example, a displayed window will allow the user to select, by way of an input device such as a keyboard or mouse, one or more applications or the operating system to be tested. A more advanced window may allow the user to select which tests to perform on a selected application. A window may display a control to access and read one or more log files maintained by test controller 206. When a user makes a selection of a control in a window displayed by interface 210, interface 210 can provide a change indication to test initiator 214 to indicate which program or programs to test.

Thus, test initiator 214 comprises logic to receive change indications from change detector 208 or from interface 210. Responsively, test initiator 214 will initiate one or more of a plurality of test sequences 216. A test sequence is one or more commands interpretable by the operating system or an Application Program Interface (API) to conduct a functional test. Thus, a sequence of commands might test a word processor, causing the word processor to execute a plurality of functions which might include opening a document or file, adding and saying text, inserting an object, converting from one style to another, performing other formatting functions, outlining, forming a table of contents and an index, changing the view of the document being displayed, emailing a document, closing and saving a document, or file, publishing a document for a website, etc. Or consider an operating system test comprising copying data and instructions from a cache to a hard drive and vice versa, executing multiple applications contemporaneously, generating control signals for external devices such as printers and video monitors, etc.

Since each function to be performed by the application during a test cycle can be performed very rapidly, an exhaustive list of functions can be performed during the test cycle. Consequently, a system operating under the directions of test controller software can quickly and exhaustively test a plurality of application programs and operating systems. In one embodiment, test initiator 214 comprises a test sequence for each of a plurality of applications and the operating system. Thus, test sequence A would be initiated to test application program A. Test sequence B would be initiated to test application program B. And so forth. Test sequence D would be initiated to test functions of the operating system itself.

For example, an upgrade or a new installation of an application program A will indicate to test initiator 214, by way of change detector 208, that application program A should be tested. Also, an application program B that interacts with program A should be tested at least as to the interactive functionality of B with respect to A. In this case, control logic of test initiator 214 will initiate and cause to be executed the test sequence for testing application program A, and will initiate and cause to be executed at least part of the test sequence for testing application program B. Consider next the example of an operating system upgrade. When an operating system is upgraded, functionality of any one, some, or all of the existing application programs can be adversely affected. Therefore, when change detector 208 of test controller 206 detects an operating system upgrade, test initiator 214 will initiate a test of the existing application programs, as well as a test of the operating system.

As a test sequence is executed, a test evaluator 218 monitors test results. In one embodiment, evaluator 218 monitors a return code for each instruction executed. When each instruction received from test controller 206 by an application program 202 is executed by the application program a return code is returned to test evaluator 218 of test controller 206. A return code of zero indicates normal execution. A return code of other than zero indicates an error condition. The value of the return code indicates the error, or type of error. When evaluator 218 receives an error indication, it sends what information it has to an error message generator 220. Error message generator 220 uses the error information it receives to generate an error message. The error message may comprise the time and date of the error, the application program or operating system that generates the error, the type of error, text descriptive of the error, a file allocation table I-node table, etc.

Each error message that error message generator 220 generates is written to a log file 222. In one embodiment, there is a different log file for each application program and for the operating system. Additionally, the system may provide a single log file to receive all error messages generated by error message generator 220. An error log file may be displayed in a window on a color video monitor. In this way, application program developers may use the information viewed in the log file to troubleshoot and enhance the application.

Thus, embodiments comprise a system for testing application programs, comprising a detection mechanism to detect an installation event comprising installation or upgrade of an application program on a computer system. The system comprises a test initiator responsive to detection of an installation event to initiate a test sequence of at least one of the application programs. The system also comprises an error detection component to detect if an error occurs during execution of an initiated test sequence.

Figure 3:
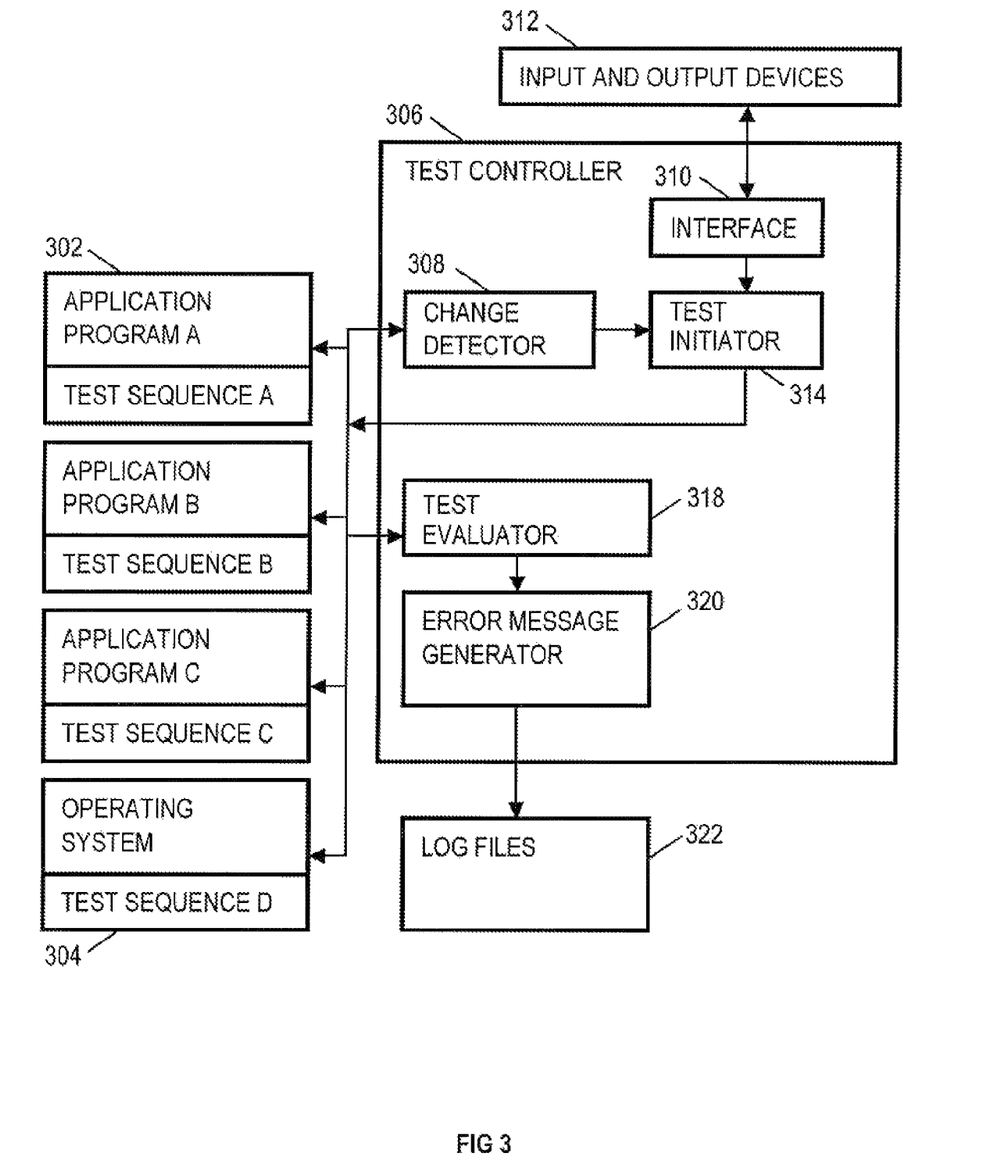
FIG. 3 depicts another embodiment of an embedded test suite for testing application programs and operating systems.

FIG. 3 shows another embodiment for automated testing of application programs and operating systems. The embodiment comprises application programs 302, labeled A through C, and an operating system 304. Components of FIG. 3 function as described for like-numbered components of FIG. 2. Thus, a change detector 308 detects a new installation or upgrade of an application program or operating system. An Interface 310 provides intelligent communication between input and output devices 312 and a test initiator 314. Test initiator 314 may receive a change indication from change detector 308 or interface 310. Responsive to its inputs, test initiator initiates tests of one or more testable programs.

A key difference between the embodiment of FIG. 3 and the embodiment of FIG. 2 is the location of the sequence of instructions comprising the test sequence for each testable program. In FIG. 3, the application developer provides a desired test sequence with the API of the application program. Similarly, the operating system developer provides a desired test sequence as part of the operating system software. Thus, in the embodiment of FIG. 3, each application program and operating system has its own test sequence. Test initiator 314 may therefore initiate the test sequence provided with a program using a single command.

In the embodiments of FIGS. 2 and 3, functions of the test controller are implemented in code separate from the operating system code. In another embodiment, one, some, or all of these functions may be incorporated into the operating system code. Thus, for example, the functions of test evaluator 318 and error message generator 320 may be incorporated into the operating system code. In another embodiment, each application will have its own test evaluator and error message generator, thereby enabling the program developer to cause generation of informative error messages to be used for diagnostics.

Figure 4:
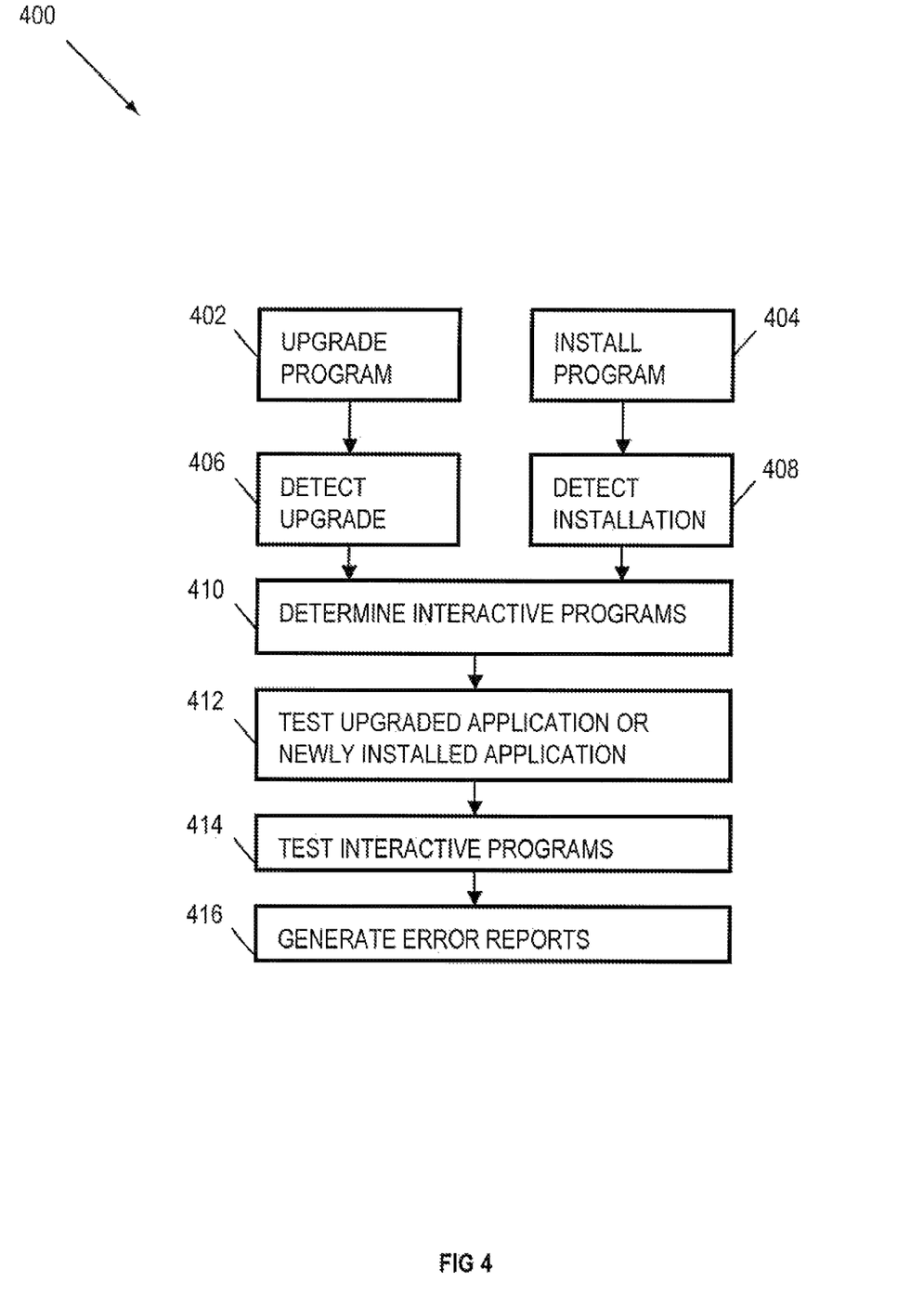
FIG. 4 depicts a flowchart of an embodiment for installed or upgraded programs and programs that interact with them.

FIG. 4 shows a flowchart 400 of an embodiment for testing of applications and operating systems. A user initiates a process of upgrading (element 402) or installing (element 404) a program, which may be an application program or an operating system. A test controller detects an upgrade (element 406) or an installation (element 408). The test controller also determines the programs that are interactive with the upgraded or installed program (element 410). The test controller initiates a test of the upgraded or installed program (element 412) and also initiates a test of the interactive programs (element 414). The system generates error reports for errors that result from the tests (element 416).

Some embodiments of the invention are implemented as a program product for use with a computer system such as, for example, the system 116 shown in FIG. 1. The program product could be used on other computer systems or processors. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Thus, another embodiment of the invention provides a machine-accessible medium containing instructions effective, when executing in a data processing system, to cause the system to perform a series of operations for testing one or more programs upon the occurrence of an installation event. The series of operations generally include detecting an installation event comprising an upgrade of an application program, initiating a test sequence in response to detection of an installation event to test one or more applications, and detecting if an error occurs during execution of an initiated test sequence. The operations may further comprise maintaining a log file of error messages generated in response to detection of errors during execution of an initiated test sequence. The operations may further comprise initiating a test of an operating system in response to a detected change in the operating system.

Thus, in one embodiment, when an operating system is installed, test control software may cause a processor to execute a series of instructions to test each of a plurality of application programs, and may test the operating system itself. This establishes a baseline of performance against which to measure performance after an upgrade of an application program or the operating system. Embodiments therefore provide a ready tool for program developers to evaluate their programs.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   detecting, by a test controller via at least one processor, an installation event, wherein the installation event is associated with a first application program to be tested and at least a second application program;
   determining, by the test controller via at least one processor, that the first application program interacts with the second application program, wherein the second application program comprises interactive functionality that interacts with the first application program;
   initiating, by a test initiator of the test controller via at least one processor, one or more test sequences for the first application program and at least the interactive functionality of the second application program in response to detection of the installation event, the one or more test sequences to comprise commands to conduct functional tests by executing and testing functionality of the first application program and at least the interactive functionality of the second application, wherein initiating the one or more test sequences comprises initiating a first test sequence of the one or more test sequences that resides in the first application program to test the interaction between the first application program and the second application program;
   detecting an error that occurs during execution of the one or more test sequences initiated by the test initiator; and
   generating, by an error message generator, at least one log file based upon the error and the one or more test sequences.

2. The method of claim 1, further comprising executing an interface to enable user control of initiation of the one or more test sequences.

3. The method of claim 1, wherein initiating the one or more test sequences comprises initiating a first test sequence of the one or more test sequences that resides in the first application program and initiating a second test sequence of the one or more test sequences that resides in the second application program, the first test sequence to test the first application program and the second test sequence to test the second application program.

4. The method of claim 3, further comprising displaying the error message for the error that arises from executing the first test sequence.

5. The method of claim 1, wherein detecting, by the test controller, the installation event comprises detecting the installation event by an operating system.

6. The method of claim 1, wherein initiating the one or more test sequences comprises initiating a test sequence residing in an operating system, wherein the first application program and the second application program execute on the operating system.

7. The method of claim 1, wherein initiating the one or more test sequences comprises initiating a test sequence residing in an operating system to test the interactive functionality of the operating system, wherein the operating system is the second application program.

8. A system for testing application programs on a computer system, comprising:
   a processor to execute a test controller;
   the test controller to detect an installation event, wherein the installation event is associated with a first application program to be tested and at least a second application program;
   the test controller to determine that the first application program interacts with the second application program, wherein the second application program comprises interactive functionality that interacts with the first application program;
   the test controller comprising a test initiator to initiate one or more test sequences for the first application program and at least the interactive functionality of the second application program in response to detection of the installation event, the one or more test sequences to comprise commands to conduct functional tests by executing and testing functionality of the first application program and at least the interactive functionality of the second application program, wherein initiating the one or more test sequences comprises initiating a first test sequence of the one or more test sequences that resides in the first application program to test the interaction between the first application program and the second application program;

the test controller to detect an error that occurs during execution of the one or more test sequences initiated by the test initiator; and the test controller comprising an error message generator to generate at least one log file based upon the error and the one or more test sequences.

9. The system of claim 8, wherein a first test sequence of the one or more test sequences resides in the first application program and a second test sequence of the one or more test sequences resides in the second application program, the first test sequence to test the first application program and the second test sequence to test the second application program.

10. The system of claim 9, wherein the test controller displays the error message for the error that arises from executing the first test sequence.

11. The system of claim 8, wherein the one or more test sequences for testing the application programs in response to the installation event resides in an operating system program.

12. The system of claim 8, wherein the test initiator initiates a test sequence within each of a plurality of application programs when an operating system is upgraded, wherein the operating system is the first application program.

13. The system of claim 8, wherein the test initiator initiates a test sequence in an operating system to test the interactive functionality of the operating system, wherein the operating system is the second application program.

14. The system of claim 8, wherein the error message generator resides in an operating system program.

15. The system of claim 8, wherein the test initiator resides in an operating system program.

16. The system of claim 8, wherein the test controller resides in an operating system program.

17. A computer system for testing application programs on the computer system, the system comprising:

a processor, a computer readable memory and a computer readable storage medium;

first program instructions to detect an installation event, wherein the installation event is associated with a first application program to be tested and at least a second application program;

second program instructions to determine that the first application program interacts with the second application program, wherein the second application program comprises interactive functionality that interacts with the first application program;

third program instructions to initiate one or more test sequences for the first application program and at least the interactive functionality of the second application program in response to detection of the installation event, the one or more test sequences to comprise commands to conduct functional tests by executing and testing functionality of the first application program and at least the interactive functionality of the second application, wherein initiating the one or more test sequences comprises initiating a first test sequence of the one or more test sequences that resides in the first application program to test the interaction between the first application program and the second application program;

fourth program instructions to detect an error that occurs during execution of the one or more test sequences initiated by the third program instructions;

fifth program instructions to generate at least one log file based upon the error and the one or more test sequences; and wherein the first, second, third, fourth, and fifth program instructions are stored on the computer readable storage medium for execution by the processor via the computer readable memory.

18. The system of claim 17, further comprising sixth program instructions to execute an interface to enable user control of initiation of the one or more test sequences wherein the sixth program instructions are stored on the computer readable storage medium for execution by the processor via the computer readable memory.

19. The system of claim 17, further comprising seventh program instructions to initiate the one or more test sequences comprises initiating a first test sequence of the one or more test sequences that resides in the first application program and initiating a second test sequence of the one or more test sequences that resides in the second application program, the first test sequence to test the first application program and the second test sequence to test the second application program wherein the seventh program instructions are stored on the computer readable storage medium for execution by the processor via the computer readable memory.

20. The system of claim 17, further comprising eighth program instructions to initiate a test sequence residing in an operating system, wherein the first application program and the second application program execute on the operating system wherein the eighth program instructions are stored on the computer readable storage medium for execution by the processor via the computer readable memory.

* * * * *